United States Patent [19]

Egert

[11] 4,345,786
[45] Aug. 24, 1982

[54] TORCH TUBING CLAMPING APPARATUS
[75] Inventor: Allen C. Egert, Denton, Tex.
[73] Assignee: Victor Equipment Co., Denton, Tex.
[21] Appl. No.: 29,370
[22] Filed: Apr. 11, 1979
[51] Int. Cl.³ .............................................. F16L 39/02
[52] U.S. Cl. ...................................... 285/131; 285/93; 285/137 R; 285/249; 285/256; 285/323
[58] Field of Search ................... 285/249, 137 R, 255, 285/322, 323, 243, 131, 132, 93, 256, 242, DIG. 7; 16/2; 239/419.3, 424.5

[56] References Cited
U.S. PATENT DOCUMENTS

| 1,304,197 | 5/1919 | Nyquist | 285/131 |
| 2,433,602 | 12/1947 | Coss | 285/242 |
| 2,538,916 | 1/1951 | Rudolph | 285/137 R X |
| 2,552,077 | 5/1951 | Williams et al. | 285/249 |
| 2,813,730 | 11/1957 | Courtat | 285/242 |
| 2,996,567 | 8/1961 | Channell et al. | 16/2 X |
| 3,583,710 | 6/1971 | Burelle | 285/137 R |
| 3,980,325 | 9/1976 | Robertson | 285/249 |

FOREIGN PATENT DOCUMENTS

| 285539 | 7/1965 | Australia | 285/137 R |
| 68338 | 9/1976 | Australia | 285/249 |
| 1391166 | 1/1965 | France | 285/249 |
| 809097 | 2/1959 | United Kingdom | 285/249 |
| 956500 | 4/1964 | United Kingdom | 285/249 |

Primary Examiner—Dave W. Arola
Attorney, Agent, or Firm—James C. Fails

[57] ABSTRACT

What is disclosed is an improvement in a tubing clamping apparatus in which a hose carrying a fluid is to be connected in fluid tight relationship with an appliance; such as, a welding torch, pressure regulator or the like; the improvement being characterized by a hose barb sealingly connected at one end with the appliance and having an outwardly extending free end having an enlarged inverted frusto-conical section thereon for sealingly receiving the hose inserted thereover, a hose inserted over the hose barb, a thermoplastic clamping means disposed about the hose and encompassing the hose between the clamping means and the hose barb to hold the hose sealingly and frictionally in place, and a retainer means for retaining the clamping means in clamping relationship with the hose and the hose barb; the retaining means being forced toward the appliance so as to apply a radially inwardly biasing force on the clamping means.

2 Claims, 11 Drawing Figures

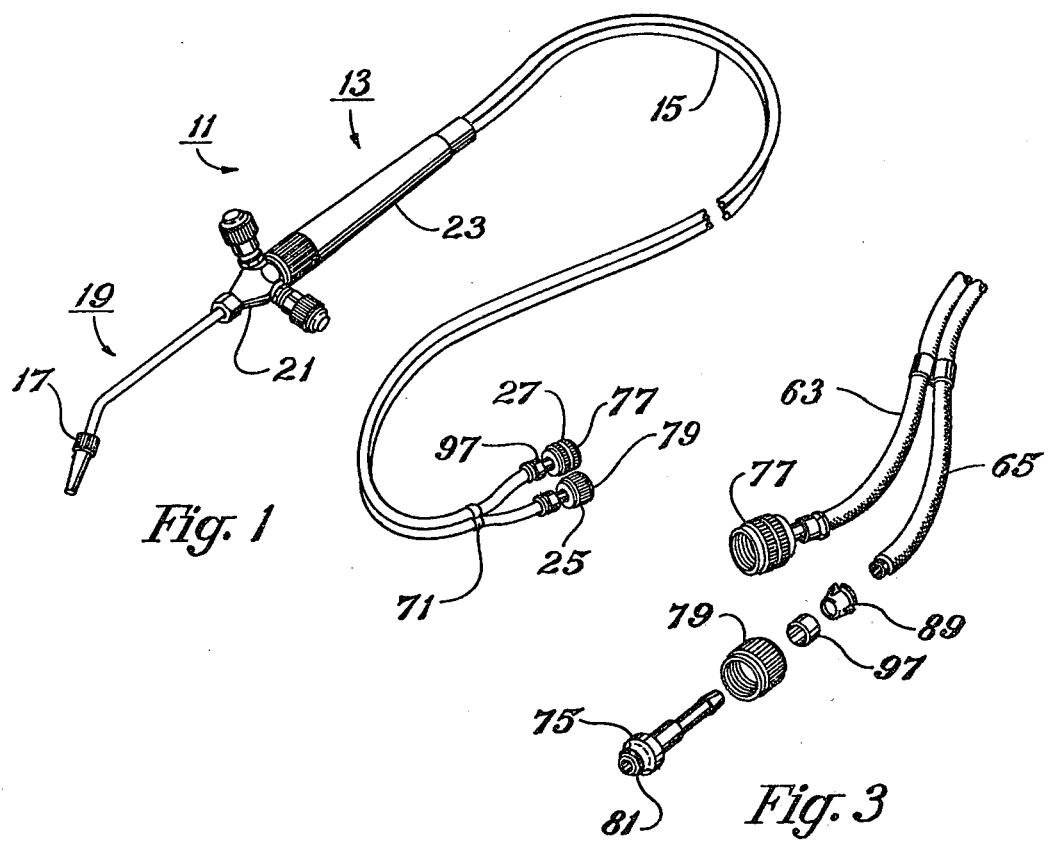
Fig. 1
Fig. 3
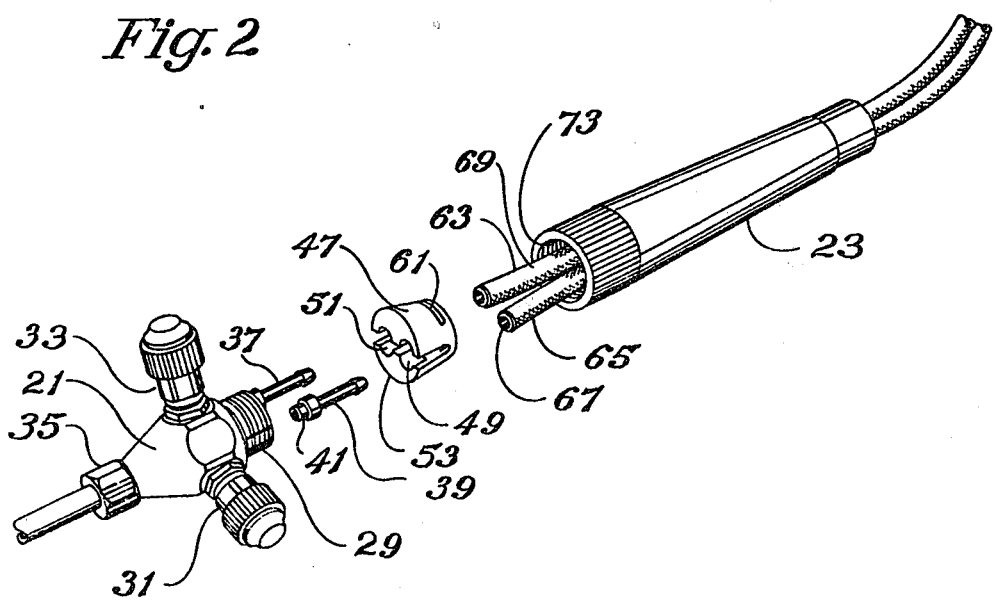
Fig. 2

TORCH TUBING CLAMPING APPARATUS

BACKGROUND OF THE INVENTION

1. Field of the Invention

This invention relates to tubing clamping apparatus such as is employed to connect a welding torch or the like with pressure regulator, the hose carrying oxygen or fuel gas.

2. Description of the Prior Art

The prior art has seen a wide variety of different types of clamping apparatus for clamping the hoses onto regulators for oxygen and fuel, such as acetylene; torches; and the like. In what is generally conceded to be the best method of the prior art, metal bands are crimped into place about the hose to hold them on serrated hose barbs. This involves careful placement of each metal band and painstaking care in crimping the metal band and to exert exactly the force to hold the hose in place against the serrated barb. Thus, a wide variety of different clamps, and metal bands had to be stocked and used carefully; otherwise the seal was not effective completely around the hose. Moreover, it is frequently desirable in the minature type torches to employ Siamese-type hoses for unitary traversal intermediate the torch and the source of fuel and oxygen, such as the regulators on the high pressure bottles. Interconnecting these hoses with the torch and with their respective regulators proved a problem with the prior art type crimping, or the other approaches used in the prior art. Also, frequently the fabric covering raveled when the metal bands were employed.

SUMMARY OF THE INVENTION

Accordingly, it is an object of this invention to provide a tubing clamping apparatus that obviates the disadvantages of requiring the clamping and crimping of metal bands in place by clamping apparatus; yet effect a complete sealing engagement of the tubing, or hose, with the hose barb.

It is another object of this invention to accomplish the foregoing object and facilitate assembly even by unskilled workmen, alleviating problems with raveling of the fabric around hoses and the like.

These and other objects will become apparent from the following descriptive matter, particularly when taken in conjunction with the appended drawings.

In accordance with this invention there is provided an improvement in a tubing clamping apparatus in which a hose carrying a fluid is to be connected in fluid tight relationship with an appliance such as a welding torch, pressure regulator, or the like. The improvement comprises:

a. a hose barb sealingly connected at one end with the appliance and having an outwardly extending free end that has an enlarged inverted frusto-conical section at the end for inserting the hose thereover and retaining it in place;

b. the hose having an end that is inserted over the hose barb;

c. thermoplastic clamping means for clamping the hose and disposed about the hose and encompassing the hose between the clamping means and the hose barb to hold the hose sealingly and frictionally in place;

d. retainer means for retaining the clamping means in clamping relationship with the hose and the hose barb; the retaining means being forced toward the appliance so as to apply a radially inwardly biasing force on the clamping means.

In the preferred embodiment this invention embodies two such tubing clamping apparatus, one for each end of the hose. Specifically, at the end of the hose next to the regulator, there is provided a hose barb connected with a sealing end for being held sealing onto the regulator. At the other end, a pair of Siamese-type hoses may be connected to the body of the torch by a thermoplastic clamp that is compressed radially inwardly by a handle that screws onto the body of the torch.

BREIF DESCRIPTION OF THE DRAWINGS

FIG. 1 is a partial isometric view of one embodiment of this invention employed on both ends of a pair of Siamese-type hoses connected with a small welding torch, such as employed by jewelers, dentists, electronic technicians and hobbyists.

FIG. 2 is a partial isometric exploded view of the embodiment of the invention interconnecting the hoses with the body of the torch.

FIG. 3 is a partial isometric exploded view of an embodiment of the invention connecting the other end of the hose to a sealing end for being attached to a pressure regulator or the like.

FIG. 6b is a cross sectional view taken along the line 6b—6b of FIG. 6a.

FIG. 7a is an end view of a clamp button in accordance with the embodiment of FIG. 3.

FIG. 7b is a cross sectional view taken along the line 7b—7b of FIG. 7a.

FIG. 8b is a cross sectional view taken along the line 8b—8b of FIG. 8a.

DESCRIPTION OF PREFERRED EMBODIMENTS

Figure 4:
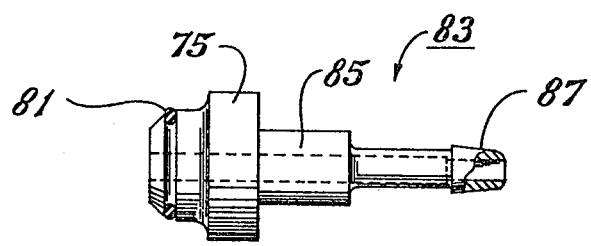
FIG. 4 is a side elevational view of a sealing end and hose barb in accordance with the embodiment of FIG. 3.

Referring to FIG. 1, there is illustrated a torch assembly 11 comprising the torch 13 and the hose assembly 15. The torch 13 includes the major elements and assemblies of the torch tip 17, elbow assembly 19, head, or body 21; and barrel, or handle, 23.

The hose assembly 15 includes the tubing clamping apparatus 25 and 27 for affixing to a pressure regulator or the like.

Referring to FIG. 2, the body 21 has a threaded end 29 for matingly and threadedly receiving the handle 23. In addition, the body 21 has respective control knobs 31 and 33 for controlling the fuel and oxygen; as well as the threaded and interconnected end and elbow nut 35 for holding the elbow assembly 19 and the tip 17 at the desired angle.

Referring to FIG. 2, the body 21 has sealingly connected thereto the hose barbs 37, 39. The hose barbs may be affixed to the body by any of the conventional methods: such as being screwed in place, bonded, chemically or thermally; shrink fit; welding; or silver soldering. As can be seen more clearly in FIG. 5, the hose barbs, such as hose barb 39 has a smooth base 41 that is bonded into a mating passageway in the body 21. If both the body and hose barb are of brass or the like, the bonding may be by a soldering technique. On the other hand, in the small torches where the heat requirements are not great, the bonding may be with a thermosetting resin such as is a catalyzed polyepoxide resin.

Figure 5:
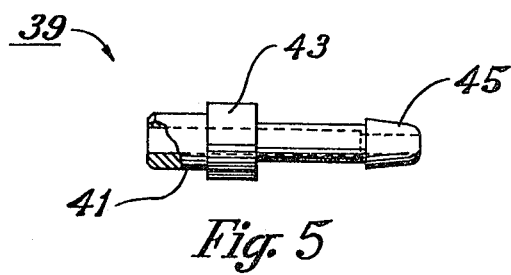
FIG. 5 is a side elevational view, partly in section of the hose barb for being connected with the body of a torch in accordance with the embodiment of FIG. 2.

The hose barb 39 has an enlarged portion 43, FIG. 5, that serves to limit its travel into the passageway in the base 21 as well as limit the travel of the hose onto the hose barb from the other side. The hose barb 39 has an enlarged inverted frusto-conical section 45 to facilitate insertion of a hose thereover and to serve to grip the hose to retain it in place when the hose is compressed thereagainst. By inverted frusto-conical section is meant that the smaller portion of the frustum is directed outwardly so as to be the first to receive the hose and facilitate the insertion of the hose thereover.

The respective hose barbs are formed of any material that will withstand the heat, that can be affixed by the method employed and that has adequate structural strength to resist breaking from the forces exerted by the hose and the welder during use.

As illustrated, there are two hose barbs for the respective fuel and oxygen passageways so as to hold in place the respective hoses when they are clamped by clamping means.

Figure 6A:
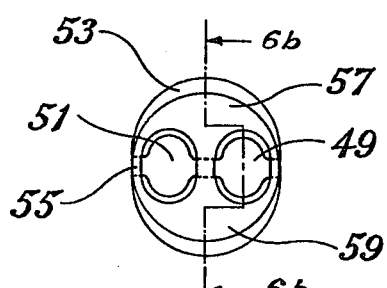
FIG. 6a is an end view of a clamp in accordance with the embodiment of the invention of FIG. 2.
Figure 6B:
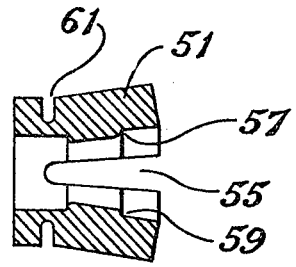

The clamping means 47, FIGS. 2 and 6a-6b, comprises a thermoplastic clamp that has two apertures 49, 51 penetrating longitudinally therethrough for receiving the hoses. The clamp 47 has a split skirt 53 in which the split 55 is designed to close substantially completely when the clamp is compressed about the hoses on the hose barbs 37, 39. A groove 61, FIGS. 2 and 6b, facilitate closure of the portions of the split skirt 53 to clamp the hoses on the hose barbs. Each of the apertures has an interiorly protruding shoulder comprising ring segments 57, 59, FIGS. 6a, 6b, that are moved radially inwardly to compress the hose onto the hose barb.

The clamp 47 may be formed of any thermoplastic material having the requisite modulus in compression to compressingly and sealingly hold the hoses in place on the hose barbs. As illustrated, polypropylene that has been molded is employed. If desired other suitable material such as Delrin, Nylon, Orlon, (Delrin, Nylon, and Orlon being trademarks for thermoplastics) rigidified polyethylene, acrylonitrile butadiene styrene copolymer (ABS) or other such thermoplastic materials can be employed. In any event, the clamp 47 must be able to clamp in place on the hose barbs the respective hoses making up the hose assembly 15.

The hose assembly 15 comprises respective hoses 63, 65, which may be color coded; for example, green for oxygen and red for fuel gas. The hoses are the conventional hoses employed and include a rubber tubing 67 on the interior and a fabric covering 69 on the exterior. The term "rubber tubing" is employed to mean any of the types of tubing such as tubing formed of Neoprene, polyethylene, or the like, regardless of whether it is truly rubber. The fabric covering may be any of the usual high strength fibers that are woven into suitable covering for the tubing. One of the difficulties of the prior art has been raveling of this fabric covering. As illustrated, the tubing 63 and 65 are formed together in a Siamese-type hose and held thusly by a band 71, FIG. 1. The hoses are inserted through the apertures 49, 51 of the clamp 47 and over the frusto conical sections 45 of the respective hose barbs 37, 39. Thereafter, the clamp 47 is slid into place to hold the tubing when it is clamped by the handle 23.

The handle 23 has an interiorly threaded section 73 that matingly engages the threaded end 29 to pull forwardly and compress the split skirt radially inwardly to clamp the hoses in place. The handle 23 may be formed of any of the conventional materials having adequate strength, such as metals like aluminum, steel or plastic materials such as the ABS plastic, polypropylene, or the like.

At the other end of the tubing assembly 15, the respective hoses 63, 65 are connected onto respective sealing ends 75, FIGS. 3 and 4. The sealing ends 75 are connectable with the conventional sealing seat by way of threaded nuts 77, 79 of the tubing clamping apparatus 25, 27, FIGS. 1 and 3. As can be seen in FIGS. 3 and 4, the sealing end 75 has a resilient seal such as o-ring 81 for sealing against the seat in the regulator. The sealing end 75, including the o-ring 81 as well as the seating seat in the regulator, are conventional and need not be described in great detail herein. As noted hereinbefore, the hose barb 83 is sealingly connected with the sealing end 75. The hose barb may be formed integrally with the sealing end or may be screwed into a passageway penetrating through the sealing end similarly as described hereinbefore with respect to the passageway in the body 21, FIG. 2. As illustrated in FIG. 4, the hose barb and sealing end are integrally formed together. As described hereinbefore, the hose barb has an enlarged portion 85, similar to the enlarged portion 43 of the hose barb of FIG. 5, to limit the travel of the hose onto the hose barb. The hose barb 83, similarly, has an enlarged, inverted frusto conical section 87 to facilitate the insertion of the hose thereover and to augment with the enlarged inner end the frictional force with which the hose is clamped in place. By the term enlarged in both the frusto conical sections, is meant that it has a larger diameter than the elongate portion of the hose barb so as to afford a physical shoulder against which to clamp the hose when the respective clamping means are moved radially inward to clamp in position the hose.

Figures 7A, 7B:
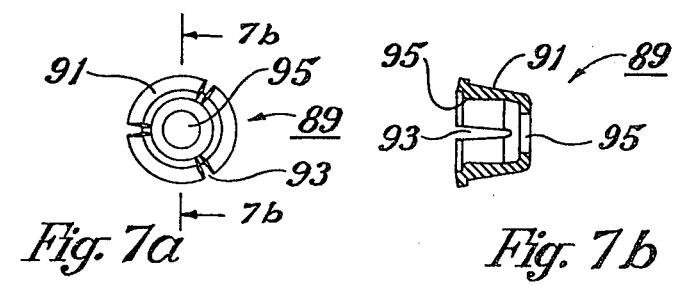
Figure 8A:
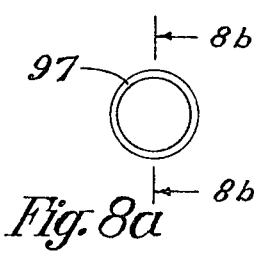
FIG. 8a is an end view of the clamp sleeve of the embodiment of FIG 3.
Figure 8B:
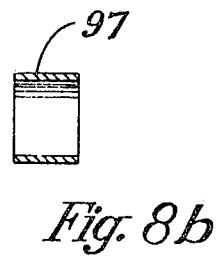

The clamping means for this end of the hose is illustrated in FIGS. 3 and 7a-7b by the clamp button, or clamp collet, 89. The clamp button 89 has a split skirt 91. The split skirt 91 is split in three equal segments by the splits 93. This is in contradistinction to the split skirt 53 which had two splits on each side of each of the apertures 49, 51. The clamp button 89 had a single aperture 95 penetrating longitudinally therethrough for receiving a single hose. The respective splits 93 are designed to be closed when the skirt segments 91 are compressed radially interiorly to clamp the hose about the hose barb 83. Each of the segments of the split skirt has a radially interiorly protruding shoulder formed by the ring segments 95 that serve to clamp the hose longitudinally interiorly and onto the frusto conical section 87.

The clamp button 89 is formed of thermoplastic material such as polypropylene or other suitable thermoplastics. Other suitable thermoplastics include Nylon, Delrin, Orlon, rigidified polyethylene or the ABS copolymer. It is imperative, however, that the clamp button have sufficient modulus of compressibility to apply the requisite holding force on the hose when compressed into position by the ring 97 serving as the retainer means for retaining the compression means in clamping relationship with the hose.

The retainer ring 97, FIGS. 1, 3 and 8a and 8b, is formed of a material having a sufficiently high modulus in tension and compression that it can be pushed longitudinally of the clamp button sufficiently to compress the ring segments 95 radially interiorly to clamp the hose onto the hose barb. As illustrated, the ring 97 is formed of a metal such as aluminum, stainless steel, brass, or the like. If a sufficiently high modulus of strength in tension is obtainable from thermoplastic materials, the thermoplastic materials can be employed, but there is a danger of cold flow of the plastic materials when employed in this retainer means.

In operation, the respective hose barbs 37, 39 and 83 are affixed, respectively to the body 21 and to respective sealing end 75. Thereafter, the hoses are inserted through the respective clamping means; the clamp 47 at the torch and the clamp buttons 89 adjacent the regulator connection. The hoses are thereafter inserted over the inverted frusto conical sections 45 and 87 of the hose barbs and the respective clamping means pushed longitudinally of the hoses into position such that the respective rings 57, 59 and 95 will clamp the hoses onto the respective hose barbs when the retainer means are emplaced. Thereafter, the handle 23 is screwed onto the threaded section 29 to move it longitudinally of and compress radially interiorly the split skirt of the clamp 47. This causes the shoulders 57, 59 to clampingly engage the exterior of the hose 63, 65 and force the hose against the hose barbs 37, 39 longitudinally interiorly of the inverted frusto conical enlarged section 45. Thus the hose is held in place with a force that is sufficiently great to prevent its being pulled from the hose barbs. In like manner, the respective hose ends adjacent the regulator are inserted over the hose barbs through the clamp buttons 89 and the rings 97 are moved longitudinally into position. The rings 97 can be moved by any means, but movement is made easy with special pliers or the like. This forces the ring segments 95 radially interiorly to clamp the respective hoses 63, 65 over the respective hose barbs longitudinally interiorly of the inverted frusto conical enlarged section 87. Sufficient force is again maintained to prevent the hoses from being pulled longitudinally off the hose barbs.

Of course, the respective threaded nuts 77, 79 will have been emplaced over the shoulder of the sealing end 75 to pull it into position on the regulator or the like. Thus the hose may be readily attached by a relatively unskilled workman without causing frazzling, or raveling, of the exterior covering and prevents the fraying of either the covering or the interior tubing while holding it in place.

From the foregoing, it can be seen that the respective elements of the brief description of the invention are shown by the respective embodiments at each ends of the hoses. Preferably, both of the tubing clamping apparatuses are employed at both ends of the hoses to facilitate assembly of a complete torch and hose assembly.

From the foregoing, it can be seen that this invention effect the objects delineated hereinbefore.

Although the invention has been described with a certain degree of particularity, it is understood that the present disclosure is made only by way of example and that numerous changes in the details of construction and the combination and arrangement of parts may be resorted to without departing from the spirit and the scope of the invention; reference being had to the appended claims for the latter purpose.

What is claimed is:

1. In tubing clamping apparatus in which a plurality of hoses carrying respective fluids are to be connected in fluid-tight relationship with a torch having a body that has two respective fuel and oxygen passageways penetrating therethrough, the improvement comprising:

two respective said hose barbs sealingly connected with said body in fluid communication with said respective passageways; said hose barbs being sealingly connected at one end with said torch and having respectively outwardly extending free ends having respective enlarged inverted frusto-conical sections; each said inverted frusto-conical section having a maximum diameter greater than said hose barbs for grippingly receiving the respective hose and having its smaller end extending away from said torch to facilitate insertion of said hose thereover;

two respective said hoses connected respectively with respective said hose barbs by being inserted thereover;

thermoplastic clamping means disposed about said hoses and encompassing said hoses between said clamping means and said hose barbs to hold respective hoses sealingly and frictionally in place; said thermoplastic clamping means comprising a thermoplastic clamp having two apertures penetrating longitudinally therethrough and having a split skirt with radially interiorly protruding shoulders for clamping said hoses; said hoses penetrating longitudinally through respective said apertures in said clamping means; said split skirt being moved radially interiorly to clamp said hoses with its said shoulders against respective said hose barbs; said shoulders comprising respective interiorly protruding segments of a ring in each aperture; said skirt being slit in two places about each hose and longitudinally along each aperture; said skirt being adapted to close said slit sufficiently to clamp said hose with said shoulders; a groove 61 being disposed adjacent the base of said split skirt to facilitate closure for clamping; and retainer means for retaining said clamping means in clamping relationships with said hoses and said hose barbs; said retainer means comprising a handle that screws onto mating threads onto said body of said torch and compressingly engages said clamping means, forcing said clamping means into clamping engagement with said hoses on respective said hose barbs.

2. In tubing clamping apparatus in which a plurality of hoses carrying respective fluids are to be connected in fluid-tight relationship with a torch having a body that has two respective fuel and oxygen passageways penetrating therethrough, and at the other end, two respective sealing ends that are connectable with respective sealing seats in a pressure regulator by way of respective threaded nuts, the improvement comprising:

two respective said hose barbs sealingly connected with said body in fluid communication with said respective passageways; said hose barbs being sealingly connected at one end with said torch and having respective outwardly extending free ends having respective enlarged inverted frusto-conical sections; each said inverted frusto-conical section having a maximum diameter greater than said hose barbs for grippingly receiving the respective hose and having its smaller end extending away from said torch to facilitate insertion of said hose thereover;

two respective said hoses connected respectively with respective said hose barbs by being inserted thereover;

thermoplastic clamping means disposed about said hoses and encompassing said hoses between said clamping means and said hose barbs to hold respective hoses sealingly and frictionally in place; said thermoplastic clamping means comprising a thermoplastic clamp having two apertures penetrating longitudinally therethrough and having a split skirt with radially interiorly protruding shoulders for clamping said hoses; said hoses penetrating longitudinally through respective said apertures in said clamping means; said split skirt being moved radially interiorly to clamp said hoses with its said shoulders against respective said hose barbs;

retainer means for retaining said clamping means in clamping relationships with said hoses and said hose barbs; said retainer means comprising a handle that screws onto mating threads onto said body of said torch and compressingly engages said clamping means, forcing said clamping means into clamping engagement with said hoses on respective said hose barbs; and at said other end, a plurality of hose barbs sealingly connected with respective sealing ends that are connectable with said respective sealing seats in said pressure regulator with respective threaded nuts; said hose barbs having outwardly extending free ends having respective enlarged inverted frusto-conical sections; each said inverted frusto-conical section having a maximum diameter greater than said hose barbs for grippingly receiving the respective hose and having its smaller end extending away from said sealing end to facilitate insertion of said respective hose thereover;

each said hose having an end that is inserted over each said hose barbs;

thermoplastic clamping means disposed about respective said hoses and encompassing said hoses between said clamping means and said hose barbs to hold respective said hoses sealingly and frictionally in place; said thermoplastic clamping means comprising a plurality of smooth, unthreaded clamp collets; each said clamp collet having a slit skirt with interiorly protruding shoulders for clamping said hose; each said slit skirt being moved interiorly radially to clamp said hose against said hose barb in operation;

retainer means for retaining said clamping means in clamping relationship with said hoses and said hose barbs; said retainer means comprising a smooth, unthreaded clamp sleeve that is forced longitudinally of and passed over said clamp collet to effect the desired clamping retention of said hose sealingly on said hose barb; said threaded nuts being disposed over respective said hose barbs and clamping said sealing ends into sealing engagement with the sealing seats in operation.

* * * * *